United States Patent

[11] 3,602,427

[72] Inventor Frederick D. Joesting
 Park Ridge, Ill.
[21] Appl. No. 35,166
[22] Filed May 6, 1970
[45] Patented Aug. 31, 1971
[73] Assignee Honeywell Inc.
 Minneapolis, Minn.

[54] PRESSURE DISCRIMINATOR
 5 Claims, 5 Drawing Figs.

[52] U.S. Cl. .................................................... 236/82,
 137/82, 137/111, 165/22, 236/1, 73/340, 236/78
[51] Int. Cl. ...................................................... G05d 23/185,
 G05b 11/50

[50] Field of Search ............................................. 236/1 B, 82,
 79, 78 B; 165/22; 137/111, 82; 73/340

[56] References Cited
 UNITED STATES PATENTS
 2,295,149  9/1942  Adams et al. ................. 236/1 B
 2,778,372  1/1957  Jaquith ......................... 137/111
 3,223,105 12/1965  Hogel ............................ 137/85

*Primary Examiner*—William E. Wayner
*Attorney*—Lamont B. Koontz

ABSTRACT: A pneumatic pressure-responsive apparatus utilizing diaphragm logic which selects and transmits the highest of a plurality of input pressures.

PATENTED AUG 31 1971

INVENTOR.
FREDERICK D. JOESTING

BY *Forrest B. Koch*

ATTORNEY.

INVENTOR.
FREDERICK D. JOESTING

ATTORNEY.

PRESSURE DISCRIMINATOR

BACKGROUND OF THE INVENTION

This invention relates to a pneumatic pressure-responsive apparatus which discriminates between a plurality of input pressures. More particularly, this invention relates to a pressure-responsive apparatus which selectively transmits the highest of three or more input pressures.

This pressure discriminator is of the type which is used in a control system wherein one seeks to optimally control a condition or conditions in a number of regions, zones, or the like. This optimal control is attained by determining which region deviates the most from its desired state. Corrective measures are instituted to return the region to its desired state in accordance with the magnitude of the deviation from its desired state as established by the pressure discriminator.

The invention is generally of the type of pressure responsive apparatus disclosed in Jacquith U.S. Pat. No. 2,778,372 which discloses the selection of the lowest or the highest of only two pressures. Many such prior art devices enable one to so discriminate between two pressures. The instant invention, however, allows one to select the highest pressure from many pressures, the number limited only by practicality. Prior art devices either had to be stacked to perform the function or required complex check valve arrangements. In a stacking arrangement, one device compares two pressures the lowest of which is selected. That pressure is then compared with a third pressure and the lowest of those two pressures is selected and so forth. The instant invention eliminates this stacking as well as check valving and provides an inexpensive, compact, reliable and adaptable apparatus which provides a high pressure selection function. In addition the instant invention provides dead ended input pressure chambers which preclude undesirable airflow in control lines.

SUMMARY OF THE INVENTION

The subject invention utilizes individual valve means or diaphragm modules to accomplish the high-pressure selection function. Each module is comprised of a housing divided by a diaphragm into a first and a second chamber. A centrally disposed passage forming partition having a valve seat means in the second chamber defines a third chamber. The partition coacts with the diaphragm to allow or prevent communication between the second and third chambers. The first chambers of each of the modules communicate with the individual sources of pressure, the highest of which is to be selected. The second and the third chambers of all of the modules are serially interconnected to provide the high-pressure selection function. Only one module is required for each incoming pressure. A source of regulated pressure is required as well as output means and exhaust means to complete the invention. The high-pressure selector may be interconnected with a previously known low-pressure selector also utilizing diaphragm modules to provide a novel high- and low-pressure selector combination.

BRIEF DESCRIPTION OF THE DRAWING

Further advantages of the subject invention will become apparent in the following detailed description and the drawing wherein.

DESCRIPTION OF THE PREFERRED EMBODIMENTS

In the following detailed description it will be assumed that the pressure discriminator will be used in a pneumatic air-conditioning control system wherein air temperature or relative humidity is controlled. This is done so that the function of the subject invention my be better clarified and is not, of course, intended to limit the scope of the invention in any way.

Figure 1:
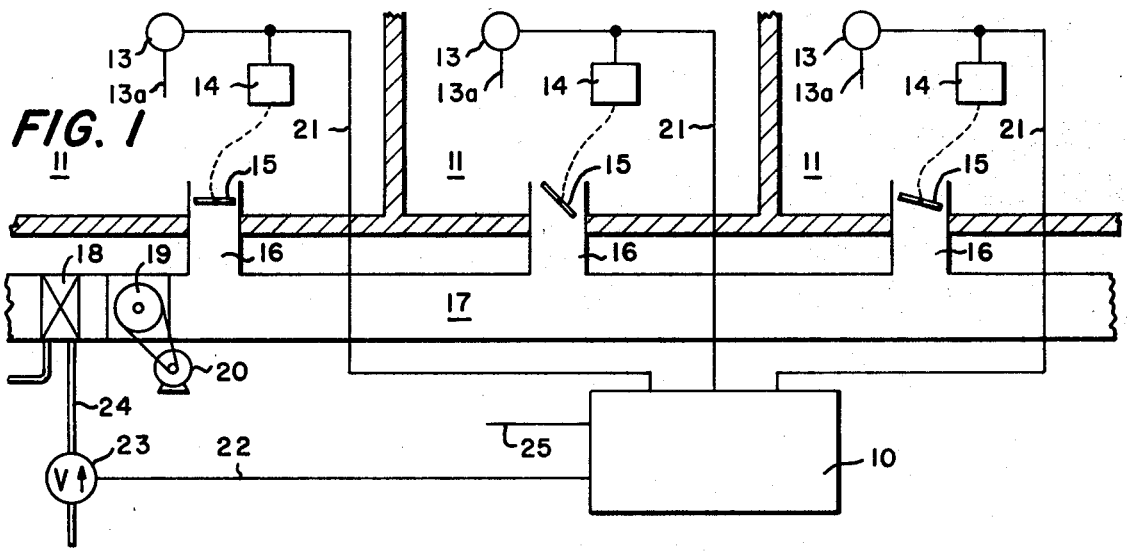
FIG. 1 is a schematic illustration of a pneumatic control system in which the high-pressure selection function may be utilized.

In FIG. 1 the pressure discriminator or pressure selector 10 is shown in a pneumatic air-conditioning control system having three regions or zone 11 separated by partitions 12. In each region is a condition-responsive device 13 such as a thermostat or humidistat, communicating with a damper motor 14. The condition-responsive devices 13 are connected via piping 13a to a source of regulated air pressure not shown. The damper motor controls a damper 15 which controls the volume of airflow through a passageway 16 communicating with a duct 7. In the duct is located a coil 18 or he like and a fan 19 driven by a motor 20. The condition-responsive device 13 in each zone is in communication with the pressure selector 10 via piping or branch lines 21. The highest pressure in the three branch lines is determined and selected by the pressure selector and is in turn communicated through piping 22 to the valve 23 which delivers an appropriate amount of condition-changing medium through piping 24 to coil 18. Connected to the pressure selector through piping 25 is a source of regulated air pressure not shown.

Figure 2:
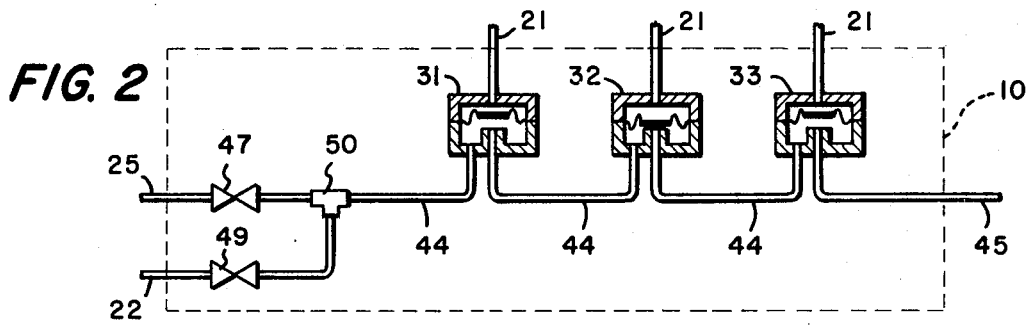
FIG. 2 is a schematic of diaphragm modules interconnected to provide a high-pressure election function.
Figure 3:
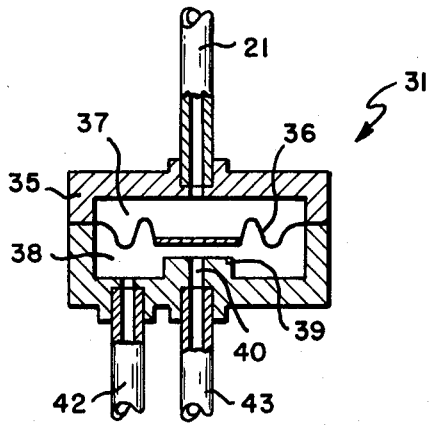
FIG. 3 is an enlarged view of a diaphragm module.

FIG. 2 is the schematic of three diaphragm modules which perform a high-pressure selection function. Diaphragm modules 31, 32 and 33 are connected through piping 21 to the various zones as illustrated in FIG. 1. As shown in FIG. 3, each diaphragm module is comprised of a housing 35 and a diaphragm 36 dividing the housing into a control chamber 37 and an inlet chamber 38. Centrally disposed within the inlet camber is an annular partition or the like 39 which defines an outlet chamber 40. The partition means 39 is designed to operate in a sealable relation with the diaphragm 36. As noted above piping 21 communicates with control chamber 37. It is important to note that control chamber 37 is dead ended; i.e. that there is no continuing flow of fluid through piping 21. This feature, unlike many bleed-type pressure selectors, preclude any effect the selector may ordinarily have on the control by the thermostat 13 of the damper motor 14.

Connection means 42 provide communication between inlet chamber 38 and piping 44. Connection means 43 provides communication between outlet chamber 40 and piping 44. In order to provide the high-pressure selection function, the outlet and inlet chambers of each of the diaphragm module are serially connected. Piping 44 establishes communication between outlet chamber 40 of diaphragm module 31 and inlet chamber 38 of diaphragm module 32. Similarly piping 44 provides communication between outlet chamber 40 of diaphragm module 32 and inlet chamber 38 of diaphragm module 33 and so forth. Connected to the outlet chamber of the last diaphragm module 33 in this series is exhaust means 45 which may exhaust to the atmosphere. Completing the configuration is piping 25 leading to a supply of regulated air pressure, not shown, which pressure is equal to or greater than the highest input pressure to be received by any of the diaphragm modules. Included in piping 25 is a restriction 47. Downstream of restriction 47 is connection 50 to which piping 22 including a restriction 49 is connected. Piping 22 provides an output pressure which corresponds and is equal to the highest input pressure. While devices 31, 32 and 33, for instance, are shown as separate units, it should be noted that their construction is such as to be readily adaptable to assembly in an unitary diaphragm logic assembly or device such as suggested by Stucki U.S. Pat. No. 2,897,834.

In summary then, three pressures are transmitted to the three diaphragm modules, a regulated source of pressure is connected to piping 25, and a pressure output is provided at 22 which corresponds and is equal to the highest pressure input. Assuming the highest pressure input is to diaphragm module 32, diaphragm 36 of that module will modulate so as to equalize the pressures in control chamber 37 and input chamber 38. Since the source of regulated pressure connected to 25 will be equal to or greater than the input pressure at diaphragm module 32, the excess air, will bleed off through piping 44 and through module 33 and out through exhaust means 45. Since the regulated pressure is module 32 is greater than the pressures in chambers 37 of modules 31 and 33, valves 31 and 33 will be held open and will not effect the output pressure.

Figure 4:
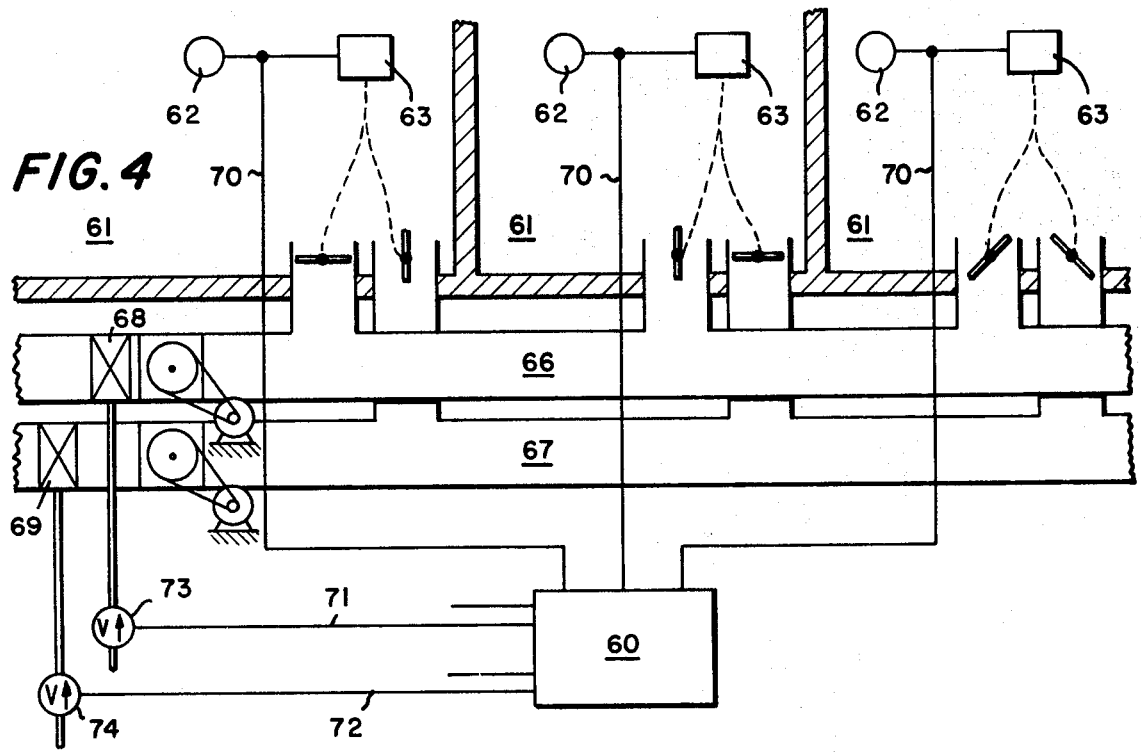
FIG. 4 is a schematic illustration of a pneumatic control system in which both the high- and the low-pressure selection functions are used.

FIG. 4 discloses a double-duct air-conditioning system having a high and low pressure selector 60. Again there are three regions or zones 61 illustrated, each having a condition-responsive device 62, a damper motor 63 and two dampers 64 and 65. Damper 64 is located in an opening into duct 66 which has a heating coil 68 located therein. Damper 65 is located in an opening into duct 67 which has a cooling coil 69. Branch lines 70 transmit from each of the zones 61 a pressure indicative of the state of the condition, such as air temperature, in that zone. The selector 60 then selects both the highest and lowest of these transmitted pressures and transmits them through pipes 71 and 72 to valves 73 and 74. These pressures cause the valves to appropriately adjust the flow of condition changing medium to coils 68 and 69.

Figure 5:
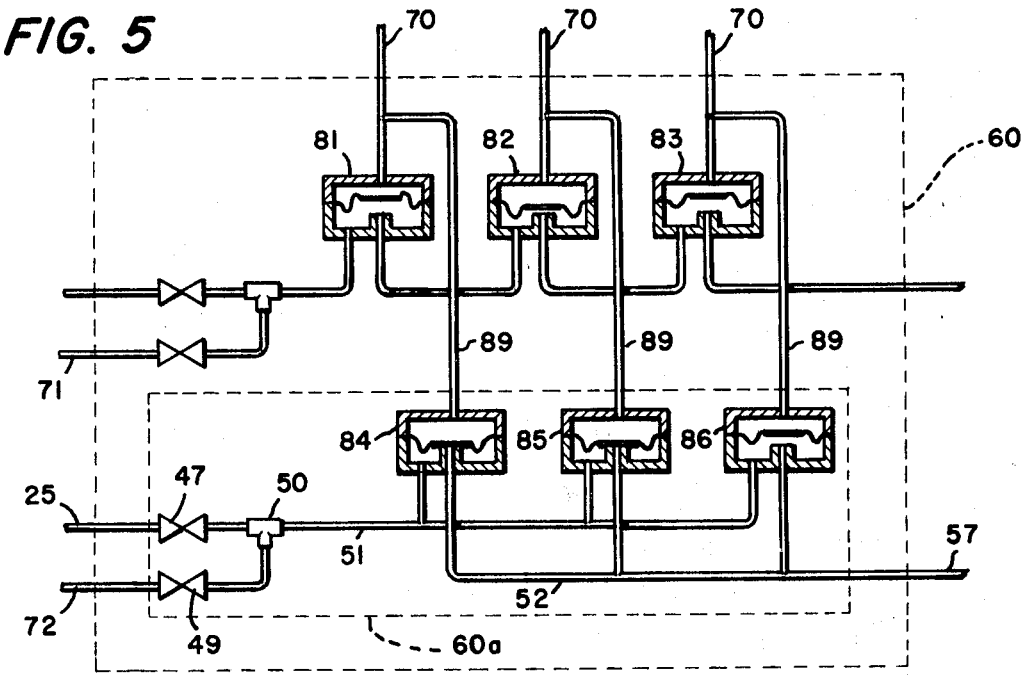
FIG. 5 is a schematic of diaphragm modules interconnected to provide both the high- and the low-pressure selection functions.

FIG. 5 is a schematic of a high-low pressure selector 60 in the type utilized in the air-conditioning system disclosed in FIG. 4. The portion 60a of FIG. 5 represents a low-pressure selector which is the subject of copending application Ser. No. 34,944 filed of even date in the names of Hogel and Spethman. The portion 60a of FIG. 5 discloses three valve means or diaphragm modules 84, 85 and 86 interconnected in a manner old in the art to provide a low-pressure selection function. Three input pressures form three zones or the like are provided at inputs 89; a source of regulated pressure provides a supply of fluid at 25, and an output pressure corresponding and equal to the lowest input pressure is provided at 72. Restrictions 47 and 49 and connection 50 are provided as in the high-pressure selection configuration. Piping 51 in FIG. 3 connects in parallel the inlet chambers 38 of each of the three diaphragm modules. Piping 52 connects in parallel each of the outlet chambers 40 of the three diaphragm modules and in addition provides an exhaust means or function at 57. If the lowest of the input pressures is delivered to module 86, the diaphragm 36 will modulate so as to equalize the pressure in control chamber 37 of module 85 and inlet chamber 38 of module 86. This modulation will bleed off, through the outlet chamber of module 85, the excess pressure through piping 52 and out exhaust 57. Again the source of regulated air pressure connected at 25 must provide a pressure equal to or greater than the highest input pressure to be received. Since the pressure applied to modules 84 and 85 is greater than the regulated pressure, 84 and 85 will be held closed and will have no effect on the output pressure.

Three additional diaphragm modules 81, 82 and 83 are interconnected in FIG. 5 to provide a high-pressure selection function as illustrated in FIG. 2. Three input pressures from the three zones 61 are provided through piping 70 to modules 81, 82 and 83 and in addition provide for the transmission of the pressures through piping 89 to the modules 84, 85 and 86. The high pressure output is provided through piping 71 and the low-pressure output is provided through piping 72.

While the subject invention has been described within the content of a pneumatic air-conditioning control system wherein air temperature or humidity is controlled, it is not intended that the scope of the invention claimed be limited by anything but the appended claims.

The embodiments of the invention in which an exclusive property or right is claimed are defined as follows:

1. Pressure-responsive apparatus adapted to selectively transmit the highest of a plurality of input pressures comprising:
   a plurality of valve means, each of said valve means including,
      housing means,
      diaphragm means dividing the housing means into a control chamber and an inlet chamber, each control chamber being adapted to receive an input pressure, and
      partition means disposed within the inlet chamber and arranged to operate in sealable relation with the diaphragm means to further define an outlet chamber;
   fluid supply means including restriction means, said fluid supply means communicating with the inlet chamber of the first of said plurality of valve means;
   output means communicating with said fluid supply means downstream of said restriction means;
   exhaust means communicating with the outlet chamber of the last of said valve means; and
   connection means serially interconnecting the outlet chamber of the first of said plurality of valve means, the inlet chamber of the last of said plurality of valve means, and both the output and the input chambers of each of the other of the plurality of valve means.

2. Pressure-responsive apparatus is described in claim 1 wherein said output means includes a restriction means.

3. Pressure-responsive apparatus as described in claim 1 in combination with a system for optimally controlling a physical condition in a plurality of zones, each of the zones having a condition-responsive device, said combination including:
   interconnected sets of said condition-responsive devices and said control chambers of said valve means; and
   output means in communication with means capable of affecting a change in said physical condition, whereby the condition-changing capability of said means is varied in accordance with the demand for such variation in the zone of greatest deviation.

4. Pressure-responsive apparatus according to claim 1 in combination with low-pressure selection apparatus comprising:
   a like plurality of valve means;
   fluid supply means including restriction means, said fluid supply means communicating with each of the inlet chambers of said like plurality of valve means;
   output means communicating with said fluid supply means downstream of said restriction means;
   exhaust means communicating with each of the outlet chambers of said like plurality of valve means;
   connection means interconnecting sets of control chambers in said like plurality of valve means and in said plurality of valve means in said pressure-responsive apparatus, whereby the highest and the lowest of the input pressures received by said combination are transmitted by the respective output means of said combination.

5. The combination according to claim 4 in combination with a system for optimally controlling a physical condition in a plurality of zones, of each of the zones having a condition-responsive device, said combination including:
   interconnected sets of said condition-responsive devices and said connection means; and
   output means of both the pressure-responsive apparatus and the low-pressure selection apparatus in communication with means capable of affecting a change in said physical condition, whereby the condition-changing capability of said means is varied in accordance with the demand for such variation in the zones of greatest deviation.